United States Patent [19]

Buchanan

[11] Patent Number: 5,029,435
[45] Date of Patent: Jul. 9, 1991

[54] LAWN TRIMMER HAVING EDGING ATTACHMENT

[76] Inventor: James O. Buchanan, 14343 Cindywood, Houston, Tex. 77079

[21] Appl. No.: 536,326

[22] Filed: Jun. 11, 1990

[51] Int. Cl.$^5$ ............................................. A01D 34/84
[52] U.S. Cl. ...................................... 56/12.1; 56/239; 56/DIG. 9; 172/17
[58] Field of Search ................ 56/239, 233, 289, 12.1, 56/12.7, DIG. 9; 172/14, 15, 17; 30/DIG. 5

[56] References Cited

U.S. PATENT DOCUMENTS

| | | | |
|---|---|---|---|
| 2,718,838 | 9/1955 | Schumacher | 172/17 |
| 2,737,105 | 3/1956 | Wilson | 172/17 |
| 4,712,363 | 12/1987 | Claborn | 56/12.7 |
| 4,756,148 | 7/1988 | Gander et al. | 56/12.7 |
| 4,914,899 | 4/1990 | Carmine | 172/17 |

Primary Examiner—Terry L. Melius
Attorney, Agent, or Firm—Dodge, Bush, Moseley & Riddle

[57] ABSTRACT

A lawn trimming tool (10) has an elongate support column or member (12) with a cutter head (16) mounted for rotation at a lower end thereof and a flexible line or string (20) extending from the cutter head (16) for cutting in a plane perpendicular to the axis of rotation. An edging attachment (28) is removably mounted by a bolt (50) to a support assembly (32) mounted on the support column (12). Front and rear rollers (58A, 58B, 58C, 58D) are mounted for rolling contact along a curb, driveway, or sidewalk (D) and an edging guide (60) secured to roller 58D rides alongside the driveway (D) for guiding the trimming tool (10).

8 Claims, 3 Drawing Sheets

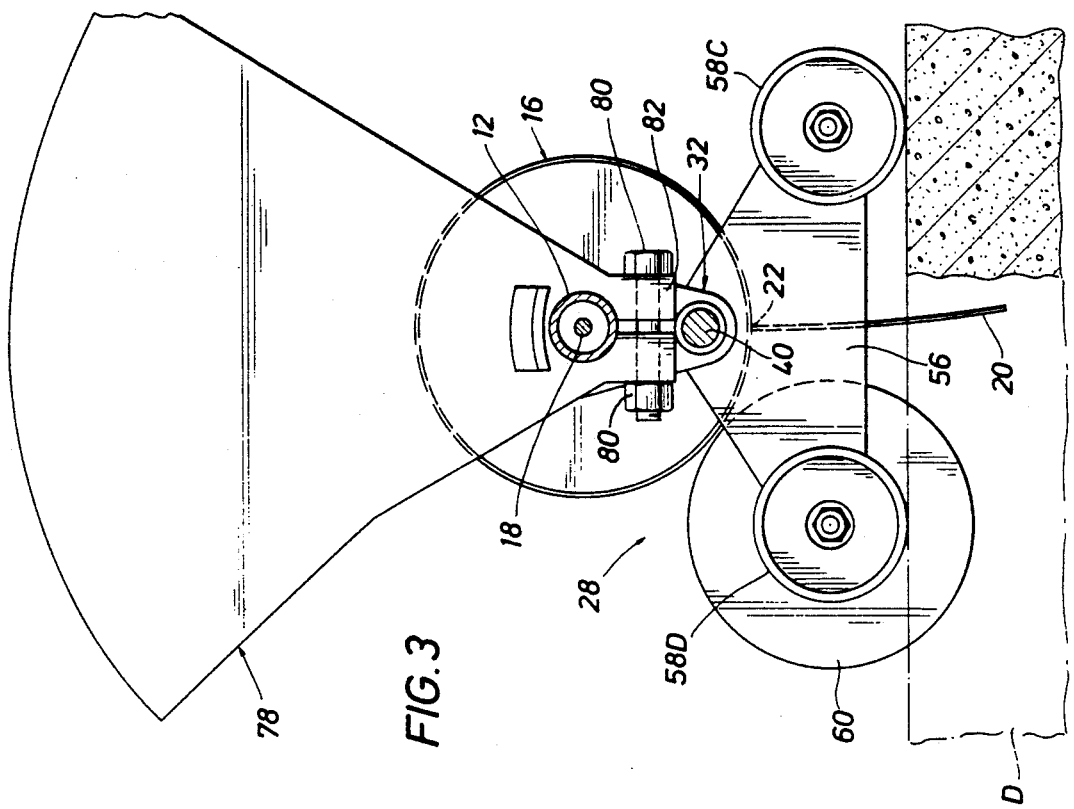
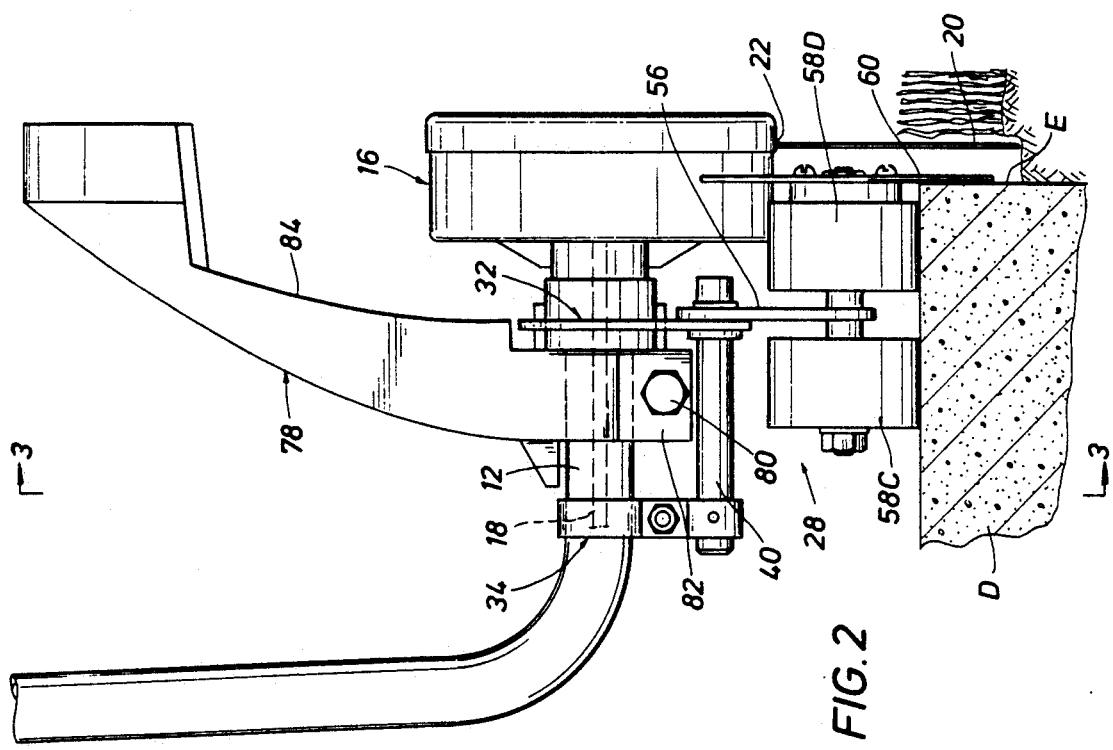

LAWN TRIMMER HAVING EDGING ATTACHMENT

BACKGROUND OF THE INVENTION

This invention relates to a lawn trimmer utilizing a resilient cutting member for cutting and more particularly to such a lawn trimmer having a removable edging attachment utilizing the resilient cutting member for edging.

Heretofore, such as shown in U.S. Pat. No. 4,756,148 dated July 12, 1988, a lawn trimmer has been provided with an edging attachment so that the cutting line functions both as a trimming line and an edging line. When utilized as an edger, it is necessary that the lawn cutter be supported at a uniform height above the lawn to be edged by the cutting line and to have an edge guide.

U.S. Pat. No. 4,756,148 utilizes a single roller riding along a curb, sidewalk, or driveway to support the line cutter in edge cutting relation without utilizing an edge guide. The roller is mounted on the cutter for movement between a retracted inoperable position and an extended operable position. The use of a single roller permits the cutter to tilt in a vertical plane during cutting movement of the cutter along a supporting surface, such as a curb, sidewalk, or driveway. A motor is mounted adjacent the cutter head which has the cutting line coiled on a spool therein.

SUMMARY OF THE INVENTION

The present invention is particularly adapted for use with a lawn string trimmer or line cutter manually supported by an operator and having a rotating cutter head containing a spool of cutting string or line, such as nylon for normally trimming the lawn with the cutting line rotating along a horizontal plane. An elongate rod-like support member or column is gripped by an operator and extends to the rotating cutter head on the lower end of the support column.

The present invention provides an edging attachment which is removably mounted on and supported by a support member connected to the trimmer. The separate support member is normally mounted on the elongate support column of the string trimmer and is thereafter not normally removed. The edging attachment itself connects to the separate support member by means of a single fastener and is, therefore, easily attached and removed from the support member without requiring special skill or tools.

The support member, on the other hand, may necessarily be of a slightly different design for adaptation to various manufacturers of lawn trimmers. The support member is of sufficient strength to support the edging attachment, and is mounted without special tools and without modification to the string trimmer and its protective guard.

The improved edging attachment has a plurality of rollers which move along a horizontal supporting surface at a uniform appropriate height without any tilting of the cutting head during operation. An edge guide is mounted concentric with one of the rollers and freely turns as it rides along the vertical edge of the curb, walkway or driveway for guiding and accurately positioning the cutting head and cutting line. The cutter head is supported by the edging attachment for rotation in a vertical plane about a horizontal rotational axis to permit the cutting line to also rotate in a vertical plane downwardly against the lawn for edging alongside the horizontal supporting surface. The edge guide which rides along the edge of the driveway or walkway is positioned an appropriate distance away from the cutting plane of the rotating string so that the string does not strike the guide while permitting the string to cut both the grass and a narrow trench in which the edge guide rides. The revolving string does an excellent job of removing dirt and debris as the grass is being cut, and the resulting narrow trench adds to the clean appearance of a well edged lawn.

It is an object of this invention to provide an edging attachment for a lawn trimmer which may be easily removed and installed.

A further object of this invention is to provide such an edging attachment having a plurality of supporting rollers with an edging guide mounted on a roller shaft for guiding the trimmer along a driveway or the like.

Other objects, advantages, and features of the invention are set forth hereinafter in the following specification and drawings.

BRIEF DESCRIPTION OF THE DRAWINGS

FIG. 2 is an end elevation, partly in section, showing the edger attachment removably mounted on a support assembly connected to the lawn trimmer while supported on a concrete driveway and guided therealong by an edge guide with the line or string trimmer engaging the lawn for edging thereof;

FIG. 3 is a side elevation, partly in section, of the edger attachment shown in FIG. 3 attached to the lawn trimmer by means of a suitable support assembly;

DESCRIPTION OF THE PREFERRED EMBODIMENT

Figure 1:
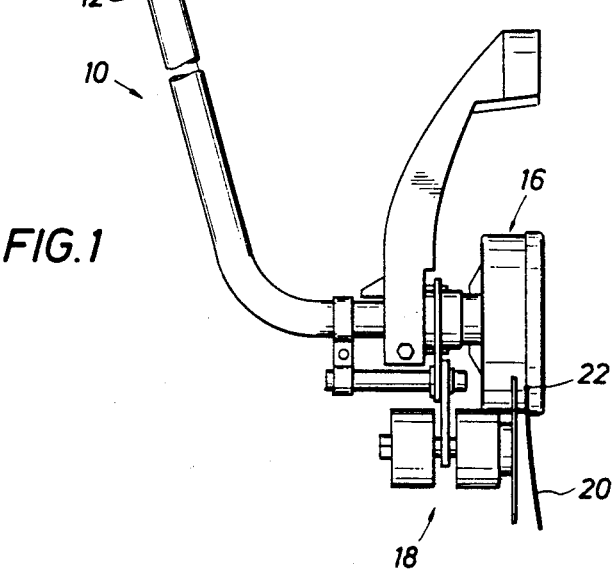
FIG. 1 is a perspective of a lawn trimmer utilizing a flexible line for cutting and including the edger attachment of the present invention mounted thereon by means of a suitable support assembly.
Figure 7:
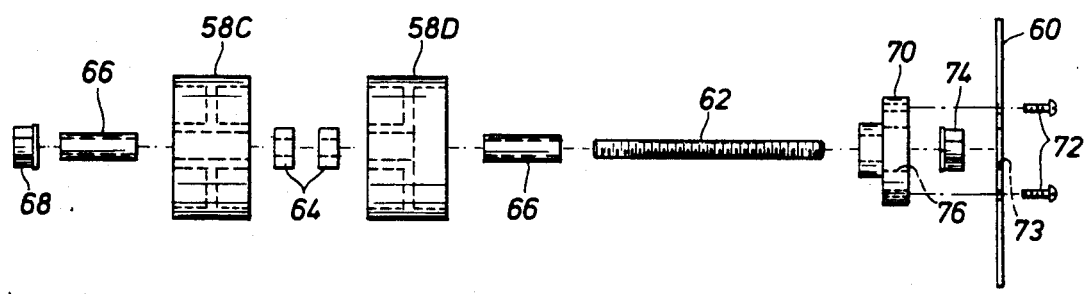
FIG. 7 is an exploded view of the edging guide and associated roller removed from the threaded supporting shaft.

Referring now particularly to FIG. 1, a lawn tool or implement comprising a line trimmer or cutter is shown generally at 10 adapted for trimming and edging a lawn while utilizing a flexible line or string for cutting of the lawn. The line trimmer 10 includes a hollow rod-like member or column 12 having a power unit generally indicated at 14 on an extending upper end thereof and a line cutting head generally indicated at 16 on the other angled lower end portion of column 12. Power unit 14 may be driven from a gasoline motor or may utilize electrical energy for driving thereof. A flexible drive cable illustrated generally at 18 extends from power unit 14 to cutting head 16 for rotation of cutting head 16 as well known.

A monofilament, non-metallic line shown generally at 20 extending from an opening 22 in cutting head 16 engages the lawn for cutting thereof. Line 20 is preferably nylon and extends outwardly from opening 22 in a spool housing within cutting head 16. Line 22 is wound on a spool (not shown) in head 16 and a line feeding mechanism (not shown) in spool housing feeds out additional lengths of line 20 as it is used as well known. Cutting head 16 for trimming grass or the like is generally maintained with line 20 extending therefrom in a generally horizontal plane for cutting of grass or weeds projecting above the sod of the lawn as desired. An operator of the trimmer 10 manually grips an adjustable handle shown at 24 with one hand and then actuates a control handle 26 with the other hand thereof for control of power unit 14.

Figure 6:
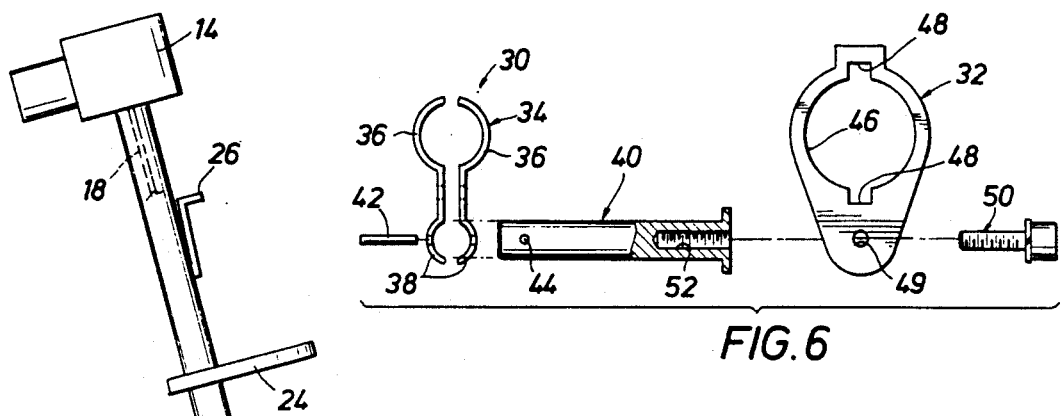
FIG. 6 is an exploded view of the support member shown in FIGS. 4 and 5 for removably mounting the edging attachment to the lawn trimmer.

The present invention is particularly directed to a removable edging attachment or device shown generally at 28 and supported from a support assembly 30 mounted on support column 12. Support assembly 30 includes a clamp 34 and a cut-out plate 32 both fitting about column 12. Clamp 34 includes a large diameter arcuate portion 36 at its upper end for fitting about column 12 and a small diameter arcuate portion 38 at its lower end for fitting about a horizontal support rod indicated generally at 40. As shown in FIG. 6, support rod 40 is secured against rotation by pin 42 extending through opening 44 in support rod 40. Cut-out plate 32 is generally of a tear drop shape having a large diameter opening 46 with keyway portions 48 for fitting over a bearing housing for cutter head 16 carried by column 12. An opening 49 is adapted to receive an externally threaded mounting bolt 50 which is threaded within threaded opening 52 of support rod 40 as shown in FIG. 5. Clamp 34 is secured to column 12 by a suitable nut and bolt combination 54 as shown particularly in FIG. 4.

Edger attachment 28 includes a main support plate or frame 56 of a generally triangular shape suspended from support rod 40. Support plate 28 has an upper opening 57 receiving bolt 50 for securement on support rod 40 to removably connect edger attachment 28 to support assembly 30. A pair of lower openings 59 in support plate 28 receive two stationary shafts 62, which are threaded end-to-end. The shafts 62 are affixed to main frame plate 56 by two pairs of internally threaded nuts 64 which are threaded about each of the threaded shafts 62 and engage plate 56 in opposed abutting relation as shown in FIG. 5 for securing shafts 62 thereon. Shafts 62 are of equal length and are each centered on plate 56 by the opposing nuts 64. The purpose of the threaded shafts 62 is to support four rollers 58A, 58B, 58C, 58D, and an edge guide disc 60 as will be explained.

For purposes of definition, the two front rollers, 58A and 58B, are farthest from the operator. Conversely, the rear rollers, 58C and 58D, are nearest the operator. Rollers 58A and 58C are on the operator's left side. The mounting of rear rollers 58C and 58D will be discussed first, along with the mounting of edge guide disc 60. The mounting of front rollers 58A and 58B will be mounted similarly and are not separately explained.

With shaft 62 in place, one of the bearing sleeves 66 is slip-fitted over each of the shaft ends extending from each side of plate 56. The left rear roller 58C is then positioned over the sleeve 66 on the left side of shaft 62 as viewed in FIG. 5. Sleeve 66 on the left side is secured tightly in place by a nut 68 on the end of shaft 62. Nut 68 abuts against the end of sleeve 66 and retains roller 58C on sleeve 66 for rotation. Roller 58D is then positioned on a bearing sleeve 66. Flanged bearing 70 having a large diameter end bore or opening 76 is also positioned on the same bearing sleeve 66 and is received within the adjacent end of roller 58D. Roller 58D is unlike the other three rollers, in that it is recessed on one side in order to receive flanged bearing 70. The overall dimensions of roller 58D, however, are the same as the other three rollers. Edge guide disc 60 is secured to flanged bearing 70 by suitable screws 72 and has a central opening 73. A nut 74 is received within opening 76 in bearing 70 and opening 73 in disc 60 for threading onto the end of threaded rod 62 in abutting engagement with bearing sleeve 66. Nut 74 also serves to retain roller 58D and the adjacent flanged bearing 70 thereon. Suitable washers may be employed with nuts 68, 74 as shown in FIG. 5, if desired. Also, spacers may be substituted for threaded nuts 64 if desired.

Figure 4:
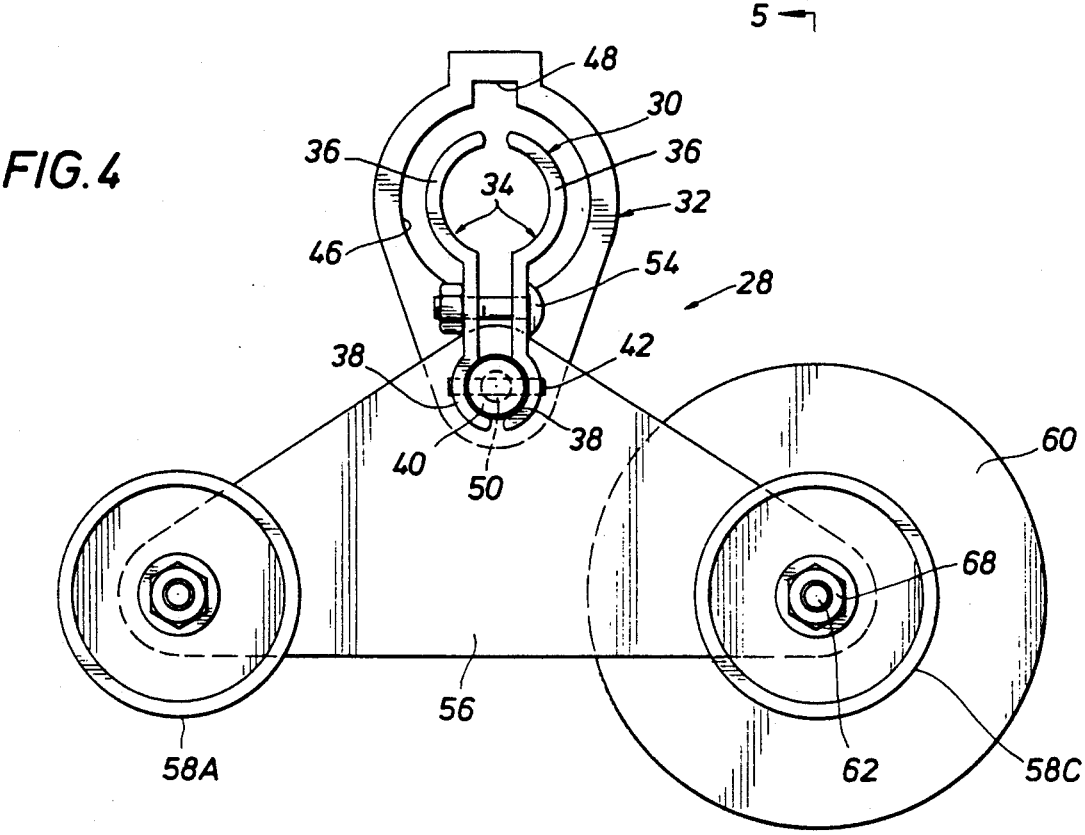
FIG. 4 is a side elevation of the edger attachment connected to a support member and removed from the lawn trimmer.
Figure 5:
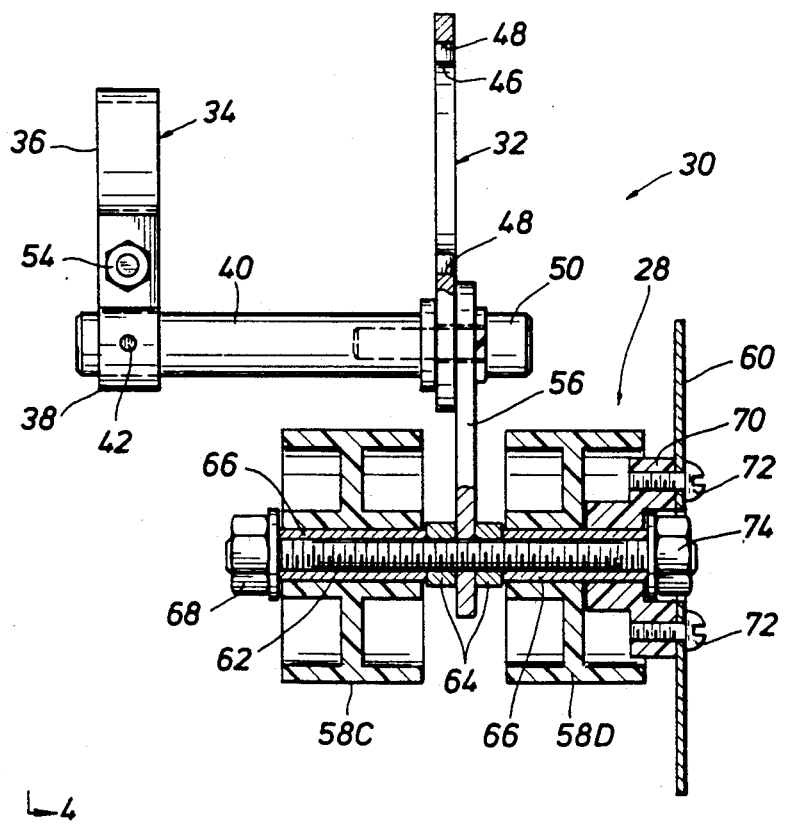
FIG. 5 is an end elevation of the edging attachment and support member shown in FIG. 4 removed from the law trimmer.

As shown particularly in FIGS. 3 and 4, a deflector or guard generally indicated at 78 is removably mounted by a nut and bolt combination 80 on the string trimmer bearing housing between clamp 30 and cut-out plate 32. Deflector 78 is in the form of a hood-like member having an inner curved surface 84 for guiding and deflecting outwardly in a direction away from the operator, any dirt, debris or vegetation as may be thrown by line 20 contacting the lawn. Deflector 78 is normally provided on a string trimmer and is not required to be modified in any way in order to receive support assembly 30 and edging attachment 28 as shown in FIGS. 2-7.

In an edging operation, with edging attachment 28 mounted on column 12 by a suitable support member, rollers 58A-58D are positioned for riding along a driveway as indicated at D in FIG. 2. With edge guide disc 60 positioned for riding along edge E of driveway D and drive means 14 energized for rotating cutting head 16 and line 20 in a vertical plane, trimmer 10 is pushed along driveway D for trimming the lawn along the edge of driveway. If it is desired to utilize trimmer 10 for trimming grass or the like with cutting head 16 held for rotation in a horizontal position, edging attachment 28 may be removed from support assembly 30 by removing screw 50. Support assembly 30 normally remains in place on column 12 once it is installed. Edging attachment 28 may also be left in place on support assembly 30 when desired, for momentary or short duration cutting operations other than edging. A disadvantage might be the added weight of edging attachment 28.

While the embodiment set forth above has been illustrated for use with a specific lawn trimmer, it is apparent that the present invention may be utilized with various other types of lawn trimmers by use of different support members or support assemblies, each adapted for a specific lawn trimmer. For example, the support assembly may include a pair of spaced clamps, if desired, for fitting about a support column without utilizing a cut-out plate. Also, a single cut-out plate might be utilized under certain designs for supporting the edger attachment.

Thus, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In a lawn trimming tool for cutting vegetation having a tubular elongate support column for manually gripping adjacent one end thereof and having a cutter head adjacent an opposite end thereof with a flexible cutting line extending from the cutter head for cutting in a plane generally perpendicular to the axis of rotation of said cutter head; an improved edging attachment for said trimming tool removably supported from said support column adjacent said cutter head and comprising:

removable support means for said edging attachment having an upper end portion removably secured about said support column adjacent said cutter head and extending downwardly therefrom when said attachment is in operable position for an edging operation;

a rod supported on the opposite lower end portion of said removable support means and extending in a direction toward said cutter;

a roller supported from said rod for rolling contact with a hard supporting surface adjacent a lawn; and an edging guide supported from said rod for riding alongside said hard supporting surface to guide said lawn trimming tool with said cutter head overhanging the lawn for edging thereof.

2. In a lawn trimming tool as set forth in claim 1;
said removable support means comprising a pair of clamping members removably secured about said support column and removably secured to said rod.

3. In a lawn trimming tool as set forth in claim 2 wherein a nut and bolt combination removably secures said pair of clamping members about said support column.

4. In a lawn trimming tool as set forth in claim 1;
a gasoline motor for rotating said cutter head mounted on an upper end of said tubular support column and a flexible drive cable extending therefrom through said tubular support column to said cutter head for rotation thereof.

5. In a gasoline powered lawn trimming tool for cutting vegetation having a tubular elongate support column with manual gripping means, a gasoline motor adjacent an upper end of the support column, a cutter head mounted for rotation from said gasoline motor adjacent an opposite angled lower end portion of said column and a flexible cutting line extending from the cutter head for cutting vegetation in a plane generally perpendicular to the axis of rotation of said cutter head;

an improved edging attachment for said trimming tool removably supported from said support column inwardly of said cutter head and comprising:

removable support means for said edging attachment having an upper end portion removably secured about said support column adjacent said cutter head and extending downwardly therefrom when said attachment is in operable position for an edging operation;

a rod supported on the opposite lower end portion of said removable support means and extending in a direction toward said cutter;

a roller supported from said rod for rolling contact with a hard supporting surface adjacent a lawn; and an edging guide supported from said rod for riding alongside said hard supporting surface to guide said lawn trimming tool with said cutter head overhanging the lawn for edging thereof.

6. In a lawn trimming tool as set forth in claim 5 wherein said removable support means comprising a pair of clamping members removably secured about said support column and removably secured to said rod.

7. In a lawn trimming tool as set forth in claim 6 wherein a nut and bolt combination removably secures said pair of clamping members about said support column.

8. In a lawn trimmer as set forth in claim 5 wherein a removable deflector is mounted on said elongate support column adjacent said edging attachment and extends upwardly over said edging attachment and said cutter head; and means removably mounting said deflector about said elongate support column.

* * * * *